UNITED STATES PATENT OFFICE.

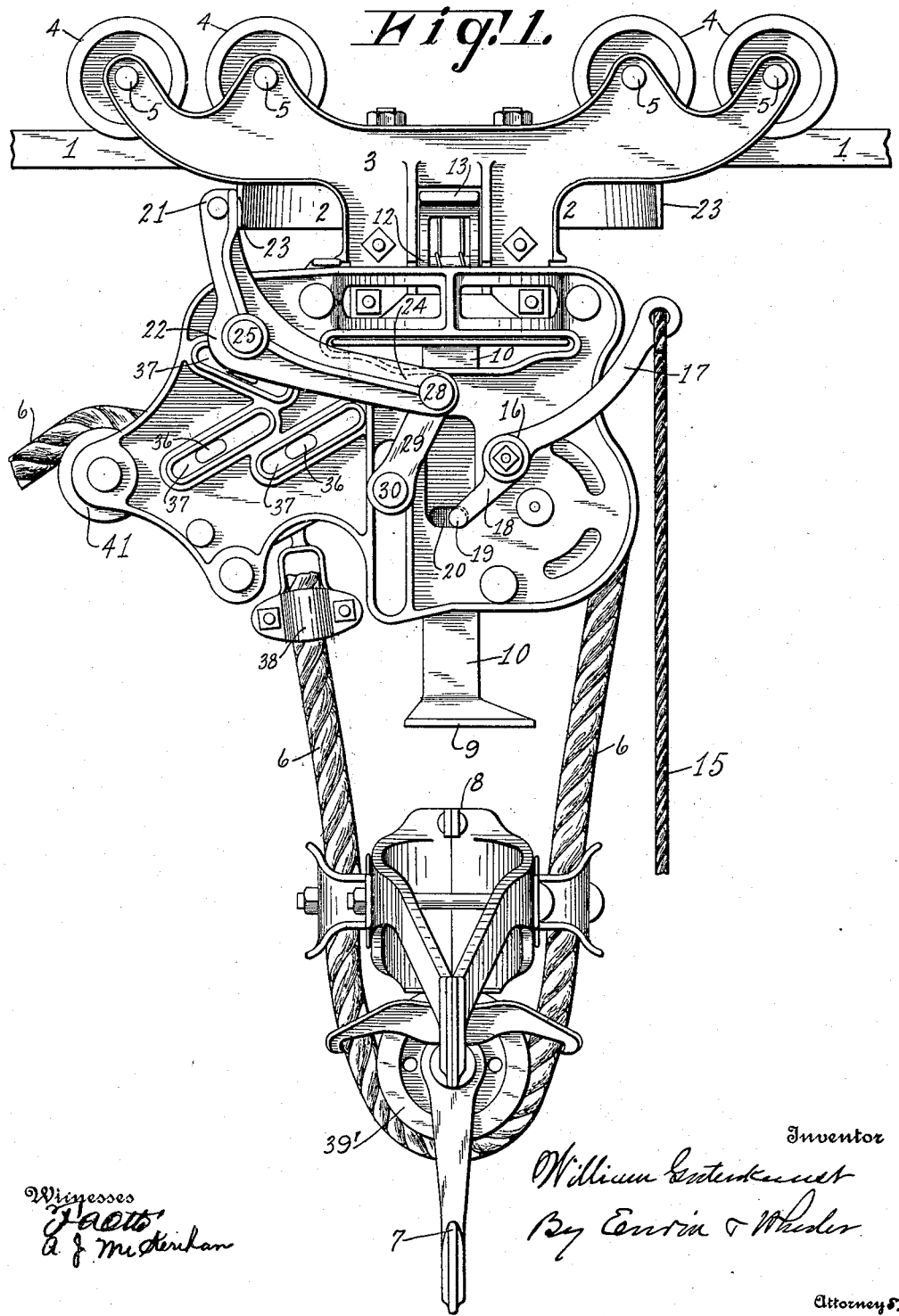

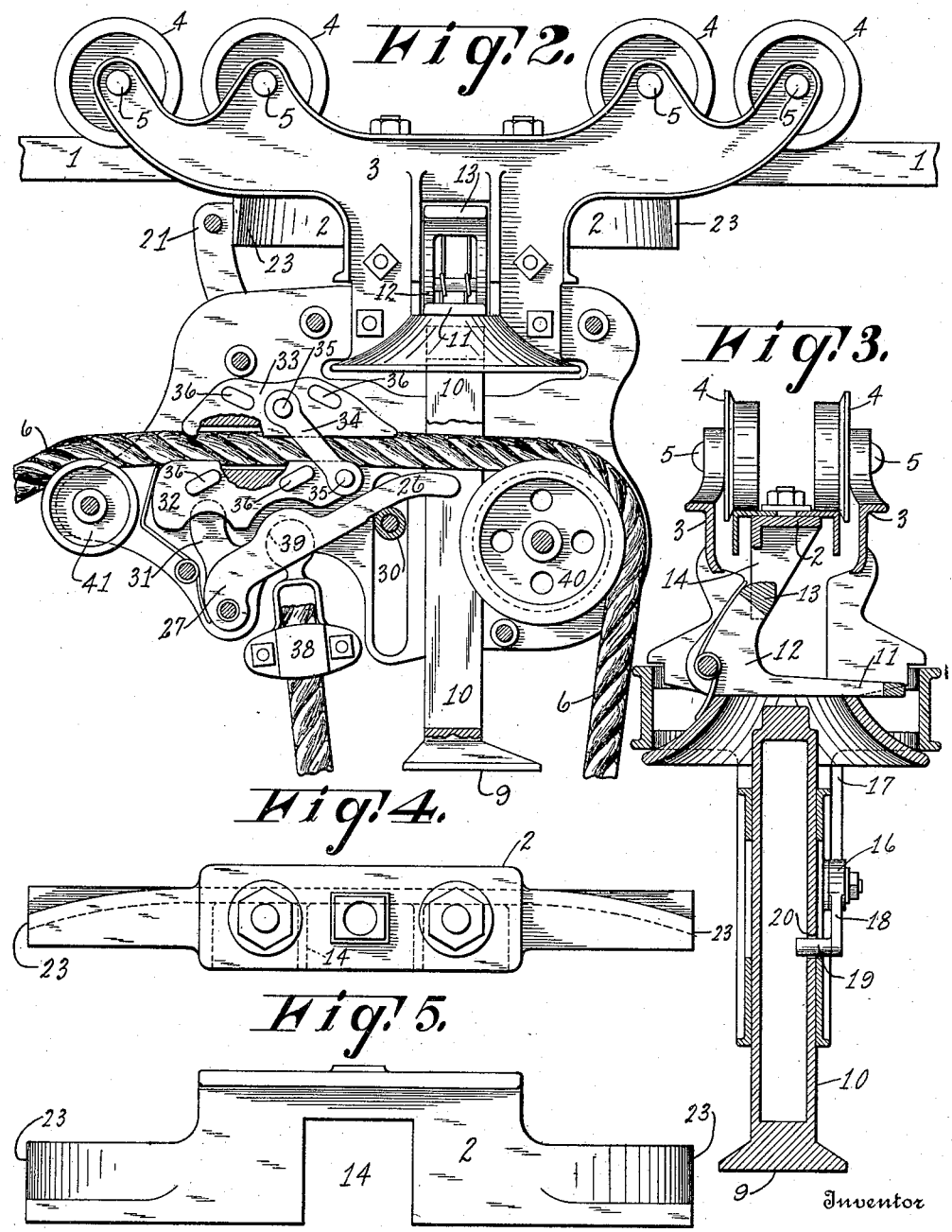

WILLIAM GUTENKUNST, OF MILWAUKEE, WISCONSIN.

HAY-CARRIER.

1,202,183.  Specification of Letters Patent.  Patented Oct. 24, 1916.

Application filed October 18, 1915. Serial No. 56,407.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Hay-Carriers, of which the following is a specification.

My invention relates to improvements in that class of hay carriers which is shown and described in the companion application for patent made by me, bearing even date herewith, Serial No. 56,406 and the present invention pertains, more especially among other things, to the device for gripping and holding the hoisting rope or cable as the load reaches any desired elevation.

My invention is further explained by reference to the accompanying drawing, in which—

Figure 1 represents a front view thereof. Fig. 2 is a front view of the upper portion of the carrier shown in Fig. 1, part broken away to show the interior construction. Fig. 3 is an end view part in section. Fig. 4 is a plan view of a notched bracket and a portion of the carrier supporting track to which said bracket is rigidly secured directly above a wagon which is being unloaded by said carrier, and, Fig. 5 is a side view of the device shown in Fig. 4.

Like parts are identified by the same reference numerals throughout the several views.

The track 1, notched bracket 2, carrier frame 3, frame supporting rollers 4, roller supporting pins 5 and cable 6 are all substantially like those parts shown and described in said companion application, and invention herein is predicated more especially, as stated, upon the device for gripping and holding the hoisting cable.

It will be understood that the notched bracket 2 is permanently secured to the track 1 directly above the wagon that is being unloaded; that the hay fork or sling, not shown, is secured to one or more hooks 7, when by the united action of a team or other motive power which is attached to the cable 6 the load is raised, whereby the upper end 8 of the tackle block is brought in contact with the block 9, whereby the vertical bar 10 is raised. As the bar 10 is thus raised its upper end is brought into contact with the horizontal arm 11 of the two armed lever 12, whereby the upper arm 13 of said lever is thrown back out of engagement with the notch 14 of the bracket 2, whereby the carrier is released from its position above the wagon when it moves to and above the place of deposit, when the load is released from the hay fork or sling in the ordinary manner. As it is frequently desirous to unload the fork or sling before the tackle block has reached the carrier, as is the case when filling the bottom of a mow, I have provided means for manually releasing the carrier as the tackle block reaches any intermediate point between the wagon and track and such carrier is thus manually released by drawing downward upon the rope 15. Motion is communicated from the rope 15 to the vertical bar 10 through the lever 16. The rope 15 is secured to the long arm 17 of said lever, whereby the short arm 18 of said lever is raised. The arm 18 is provided with an angular bend or lug 19 which engages the elongated aperture 20 of said vertical bar 10, whereby said bar is raised, as stated, by a downward pull on said rope 15 when the vertical bar 10 is thereby brought into contact with the arm 11, whereby the arm 13 is withdrawn from the notch 14 and the carrier released as previously described.

When the fork or sling has been discharged, as stated, the carrier is brought back to its original starting point above the wagon, when it becomes desirable to release the hoisting cable and draw the tackle block back to the wagon which is being unloaded. It will now be obvious that as the carrier is thus drawn back above the wagon the arm 21 of the lever 22 is brought into contact with the end 23 of the bracket 2, whereby said arm 21 is inclined toward the left, reference being had to Figs. 1 and 2 of the drawings, whereby the arm 24 is raised. The lever 22 is pivotally supported from the carrier frame upon the bolt 25 and the arm 24 is connected with the arm 26 of the lever 27 by the pivotal bolt 28 and link 29, shown in Fig. 1, and by bolt 30, as shown in Figs. 1 and 2. Thus, it is obvious that as said arm 21 is brought in contact with the end of the stationary bracket 2, as shown in Figs. 1 and 2, said arm 26 will be raised, whereby the arm 31 which is rigidly connected with said lever 27 will be moved toward the left, whereby the lower gripping jaw 32 will be moved downward and toward the left, when motion will be communicated from said gripping jaw 32 to the upper gripping jaw 33 through one or more links 34 and pivotal bolts 35, 35, whereby the upper jaw will be raised and moved toward the left, reference being had to Fig. 2, whereby said cable 6 will be released from both of said gripping jaws, when the tackle block, fork, etc., connected therewith may be again drawn down to the wagon which is being unloaded.

The gripping jaws 32 and 33 are each provided with two or more guide lugs 36, 36 which lugs have bearings in the elongated slots 37, 37 of the carrier frame, whereby said gripping jaws are caused to move toward and from said hoisting cable. It will, of course, be understood that when said carrier is released and moves away from said bracket said arms 21 and 24 will be free to move in the opposite direction, when said arm 26 will be drawn down by the weight of the load carried by said cable 6, whereby the arm 31 will be moved toward the right when said grip jaws will be again brought into gripping engagement with said cable. The free end of the cable 6 is connected with the arm 26 by the clamping members 38 and the reversal joint 39, shown and indicated by dotted lines in Fig. 2. The cable 6 passes from the clamping member 38 down beneath the pulley 39' thence up and over the pulleys 40 and 41 and from there to the team or other motive power used for operating the carrier.

Attention is called to the fact that by the construction shown in my said companion application motion is communicated from an operating lever as the carrier is brought to rest above the load to the gripping jaws through a gear segment, a gear and a tooth bar, all of which tooth members coöperate to communicate motion from said lever to said gripping jaws, while by my present construction above described motion is communicated from a similar lever to the gripping jaws through a plurality of levers and sliding members, and said tooth members are dispensed with.

Having thus described my invention what I claim as new and desire to secure by Letters Patent, is:—

1. In a device of the described class, the combination of a carrier frame provided with a plurality of straight converging recesses, a pair of gripping jaws, one jaw being located on a plane above the other, each of said jaws having slidable bearings located in said converging recesses, a hoisting cable having a forward and backward movement between the gripping surfaces of said jaws, and means for moving said gripping jaws into and out of gripping contact with said cable.

2. In a device of the described class, the combination of a carrier frame provided with straight converging recesses, two gripping jaws, one jaw being located on a plane above the other, each of said jaws having slidable bearings located in said converging recesses, a pair of links pivotally connected at their respective ends to the respective sides of said jaws, said links being adapted to communicate motion from one of said jaws to the other, a hoisting cable having a forward and backward movement between the gripping surfaces of said jaws, and means for automatically moving said gripping jaws out of engagement with said hoisting cable.

3. In a device of the described class, the combination of a carrier frame provided with straight converging recesses, two gripping jaws, one jaw being located on a plane above the other, each of said jaws having slidable bearings located in said converging recesses, links pivotally connected at their ends with said jaws, a hoisting cable having a forward and backward movement between the gripping surfaces of said jaws, and means for both manually and automatically moving said gripping jaws into and out of gripping contact with said hoisting cable.

4. In a device of the described class, the combination of a carrier frame provided with a plurality of converging recesses, a plurality of horizontally arranged gripping jaws having slidable bearings in said recesses, a hoisting cable having a forward and backward horizontal movement between the opposing surfaces of said gripping jaws, a link for communicating motion from one of said gripping jaws to the other upon the opposite side of said cable, an arm connected with said carrier frame and pivotally connected through a link, a slidable member and a two armed lever, with said gripping jaws, a bracket rigidly affixed to a track from which said carrier frame is suspended, said arm being adapted as said carrier frame is brought beneath said bracket to move, whereby motion is communicated therefrom through said intermediate parts to one of said gripping jaws and from said gripping jaw through a link to the other gripping jaw, whereby said hoisting cable is released from both of said gripping bearings as the carrier frame is brought beneath said stationary bracket.

In testimony whereof I affix my signature in the presence of two witnesses.

WILLIAM GUTENKUNST.

Witnesses:
JAS. B. ERWIN,
IRMA D. BREMER.

Copies of this patent may be obtained for five cents each, by addressing the "Commissioner of Patents. Washington, D. C."